United States Patent
Walters et al.

(10) Patent No.: US 10,412,214 B2
(45) Date of Patent: *Sep. 10, 2019

(54) SYSTEMS AND METHODS FOR CLUSTER-BASED VOICE VERIFICATION

(71) Applicant: Capital One Services, LLC, McLean, VA (US)

(72) Inventors: Austin Walters, Savoy, IL (US); Jeremy Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/263,404

(22) Filed: Jan. 31, 2019

(65) Prior Publication Data

US 2019/0245967 A1 Aug. 8, 2019

Related U.S. Application Data

(63) Continuation of application No. 16/118,032, filed on Aug. 30, 2018, now Pat. No. 10,205,823, which is a
(Continued)

(51) Int. Cl.
| | |
|---|---|
| *H04M 3/42* | (2006.01) |
| *G10L 17/00* | (2013.01) |
| *G10L 25/51* | (2013.01) |
| *G10L 17/26* | (2013.01) |
| *G10L 25/06* | (2013.01) |

(Continued)

(52) U.S. Cl.
CPC ......... *H04M 3/42042* (2013.01); *G10L 17/00* (2013.01); *G10L 17/005* (2013.01); *G10L 17/26* (2013.01); *G10L 25/51* (2013.01); *G10L 25/06* (2013.01); *G10L 25/27* (2013.01); *G10L 25/30* (2013.01); *H04M 2201/41* (2013.01);
(Continued)

(58) Field of Classification Search
CPC .. H04M 3/42042; G10L 17/005; G10L 17/26; G10L 25/30
USPC .................................. 455/415, 414.1, 414.4
See application file for complete search history.

(56) References Cited

U.S. PATENT DOCUMENTS 7,812,766 B2 10/2010 Leblanc et al.
8,140,392 B2 3/2012 Altberg et al.
(Continued)

OTHER PUBLICATIONS

European Search Report from EP Application No. 19152182.2 dated May 23, 2019.
(Continued)

*Primary Examiner* — Marceau Milord
(74) *Attorney, Agent, or Firm* — DLA Piper LLP US

(57) ABSTRACT

Systems for caller identification and authentication may include an authentication server. The authentication server may be configured to receive audio data including speech of a plurality of telephone calls, use audio data for at least a subset of the plurality of telephone calls to store a plurality of known characteristics each associated with a specific demographic, and/or use audio data for at least one of the plurality of telephone calls to identify the telephone caller making the telephone call based on determining a most similar known characteristic of the plurality of known characteristics to the audio data of the caller.

20 Claims, 4 Drawing Sheets

Related U.S. Application Data continuation of application No. 15/980,214, filed on May 15, 2018, now Pat. No. 10,091,352, which is a continuation of application No. 15/891,712, filed on Feb. 8, 2018, now Pat. No. 10,003,688.

(51) Int. Cl.
*G10L 25/30* (2013.01)
*G10L 25/27* (2013.01)

(52) U.S. Cl.
CPC ............ *H04M 2203/556* (2013.01); *H04M 2203/6045* (2013.01)

(56) References Cited

U.S. PATENT DOCUMENTS

| | | |
|---|---|---|
| 8,238,540 B1 | 8/2012 | Duva et al. |
| 8,248,237 B2 | 8/2012 | Fitzgerald et al. |
| 8,411,828 B2 | 4/2013 | Ashton et al. |
| 8,532,630 B2 | 9/2013 | Mattes |
| 8,571,016 B2 | 10/2013 | Urzi et al. |
| 8,577,016 B1 | 11/2013 | Duva et al. |
| 8,599,836 B2 | 12/2013 | Van Buren et al. |
| 8,660,849 B2 | 2/2014 | Gruber et al. |
| 8,768,313 B2 | 7/2014 | Rodriguez |
| 8,781,105 B1 | 7/2014 | Duva et al. |
| 8,781,923 B2 | 7/2014 | Pitroda et al. |
| 8,792,864 B1 | 7/2014 | Migimatsu et al. |
| 8,847,285 B2 | 9/2014 | Parks |
| 8,868,039 B2 | 10/2014 | Rodriguez et al. |
| 8,917,860 B2 | 12/2014 | Duva et al. |
| 8,932,368 B2 | 1/2015 | Fitzgerald et al. |
| 9,031,536 B2 | 5/2015 | Fitzgerald et al. |
| 9,036,808 B2 | 5/2015 | Kelley et al. |
| 9,171,322 B2 | 10/2015 | Spievak et al. |
| 9,197,736 B2 * | 11/2015 | Davis .................. G06F 3/04842 |
| 9,292,861 B2 | 3/2016 | Spievak et al. |
| 9,438,733 B2 | 9/2016 | Spievak et al. |
| 9,571,646 B2 | 2/2017 | Kumar et al. |
| 9,647,978 B2 | 5/2017 | Kirchhoff et al. |
| 9,818,115 B2 | 11/2017 | Tonini |
| 9,838,877 B2 | 12/2017 | Fitzgerald et al. |
| 9,881,618 B2 | 1/2018 | Choi et al. |
| 9,916,481 B2 | 3/2018 | Fitzgerald et al. |
| 9,959,850 B2 * | 5/2018 | Eronen ................. G10L 25/51 |
| 10,003,688 B1 * | 6/2018 | Walters ................ G10L 25/51 |
| 10,091,352 B1 * | 10/2018 | Walters ................ G10L 25/51 |
| 10,194,023 B1 * | 1/2019 | Kong ................. H04M 3/42042 |
| 10,205,823 B1 * | 2/2019 | Walters ................ G10L 25/51 |
| 2004/0193740 A1 | 9/2004 | Kasmirsky et al. |
| 2005/0018622 A1 | 1/2005 | Halbraich et al. |
| 2005/0123115 A1 | 6/2005 | Gritzer et al. |
| 2006/0045185 A1 | 3/2006 | Kiryati et al. |
| 2006/0074660 A1 | 4/2006 | Waters et al. |
| 2006/0133624 A1 | 6/2006 | Waserblat et al. |
| 2006/0136597 A1 | 6/2006 | Shabtai et al. |
| 2006/0179064 A1 | 8/2006 | Paz et al. |
| 2006/0227719 A1 | 10/2006 | Halbraich |
| 2006/0268847 A1 | 11/2006 | Halbraich et al. |
| 2006/0285665 A1 | 12/2006 | Wasserblat et al. |
| 2007/0122003 A1 | 5/2007 | Dobkin et al. |
| 2007/0250318 A1 | 10/2007 | Waserblat et al. |
| 2008/0040110 A1 | 2/2008 | Pereg et al. |
| 2008/0066184 A1 | 3/2008 | Ben-Ami et al. |
| 2008/0139167 A1 | 6/2008 | Burgess |
| 2008/0148397 A1 | 6/2008 | Litvin et al. |
| 2008/0152122 A1 | 6/2008 | Idan et al. |
| 2008/0154609 A1 | 6/2008 | Wasserblat et al. |
| 2008/0181417 A1 | 7/2008 | Pereg et al. |
| 2008/0189171 A1 | 8/2008 | Wasserblat et al. |
| 2008/0195385 A1 | 8/2008 | Pereg et al. |
| 2008/0195387 A1 | 8/2008 | Zigel et al. |
| 2008/0228296 A1 | 9/2008 | Eilam et al. |
| 2009/0007263 A1 | 1/2009 | Frenkel et al. |
| 2009/0012826 A1 | 1/2009 | Eilam et al. |
| 2009/0033745 A1 | 2/2009 | Yeredor et al. |
| 2009/0043573 A1 | 2/2009 | Weinberg et al. |
| 2009/0150152 A1 | 6/2009 | Wasserblat et al. |
| 2009/0248415 A1 * | 10/2009 | Jablokov ................ G10L 15/30 704/251 |
| 2009/0292541 A1 | 11/2009 | Daya et al. |
| 2009/0292583 A1 | 11/2009 | Eilam et al. |
| 2010/0070276 A1 | 3/2010 | Wasserblat et al. |
| 2010/0088323 A1 | 4/2010 | Ashkenazi et al. |
| 2010/0106499 A1 | 4/2010 | Lubowich et al. |
| 2010/0161604 A1 | 6/2010 | Mintz et al. |
| 2010/0199189 A1 | 8/2010 | Ben-Aroya et al. |
| 2010/0228656 A1 | 9/2010 | Wasserblat et al. |
| 2010/0246799 A1 | 9/2010 | Lubowich et al. |
| 2011/0004473 A1 | 1/2011 | Laperdon et al. |
| 2011/0161076 A1 | 6/2011 | Davis et al. |
| 2011/0206198 A1 | 8/2011 | Freedman et al. |
| 2011/0208522 A1 | 8/2011 | Pereg et al. |
| 2011/0244887 A1 | 10/2011 | Dupray et al. |
| 2011/0282661 A1 | 11/2011 | Dobry et al. |
| 2011/0307257 A1 | 12/2011 | Pereg et al. |
| 2011/0307258 A1 | 12/2011 | Liberman et al. |
| 2012/0053990 A1 | 3/2012 | Pereg et al. |
| 2012/0114314 A1 | 5/2012 | Pashkevich et al. |
| 2012/0116766 A1 | 5/2012 | Wasserblat et al. |
| 2012/0155663 A1 | 6/2012 | Weinberg et al. |
| 2012/0209605 A1 | 8/2012 | Hurvitz et al. |
| 2012/0209606 A1 | 8/2012 | Gorodetsky et al. |
| 2012/0215535 A1 | 8/2012 | Wasserblat et al. |
| 2012/0296642 A1 | 11/2012 | Shammass et al. |
| 2013/0057721 A1 | 3/2013 | Shmueli et al. |
| 2013/0142318 A1 | 6/2013 | Margolis et al. |
| 2013/0315382 A1 | 11/2013 | LIberman et al. |
| 2013/0336137 A1 | 12/2013 | Cohen et al. |
| 2013/0343731 A1 | 12/2013 | Pashkevich et al. |
| 2014/0025376 A1 | 1/2014 | Wasserblat et al. |
| 2014/0049600 A1 | 2/2014 | Goldner et al. |
| 2014/0050309 A1 | 2/2014 | Teitelman et al. |
| 2014/0067373 A1 | 3/2014 | Wasserblat et al. |
| 2014/0098954 A1 | 4/2014 | Keidar et al. |
| 2014/0106776 A1 | 4/2014 | Levin et al. |
| 2014/0136194 A1 | 5/2014 | Warford et al. |
| 2014/0200929 A1 | 7/2014 | Fitzgerald et al. |
| 2015/0142704 A1 | 5/2015 | London |
| 2015/0379562 A1 | 12/2015 | Spievak et al. |
| 2016/0173693 A1 | 6/2016 | Spievak et al. |
| 2017/0192955 A1 | 7/2017 | Zeichner et al. |

OTHER PUBLICATIONS

Dou et al, "DemographicVis: Analyzing demographic information based on user generated content", IEEE Conference on Visual Analytics Science and Technology (VAST), Oct. 25, 2015, pp. 57-64.

* cited by examiner

SYSTEMS AND METHODS FOR CLUSTER-BASED VOICE VERIFICATION

CROSS-REFERENCE TO RELATED APPLICATION INFORMATION

This is a continuation of U.S. patent application Ser. No. 16/118,032 filed Aug. 30, 2018, which is a continuation of U.S. patent application Ser. No. 15/980,214, filed May 15, 2018, which is a continuation of U.S. patent application Ser. No. 15/891,712, filed Feb. 8, 2018, the entirety of each application is incorporated herein by reference.

BACKGROUND

Providers of secure user accounts, such as bank accounts, credit card accounts, and/or other secure accounts, may provide phone-based services to their users. For example, users wishing to set up new accounts may call a phone number to speak with an automated account system and/or a live representative. In another example, account holders may call a phone number to speak with an automated account system and/or a live representative in order to resolve issues with their account and/or access account features and/or functions. In another example, users may receive phone calls from the provider, for example when potential account fraud is detected and/or to offer account services. Because the user accounts may be related to sensitive information such as user identity information and/or access to user funds and/or credit, account providers may provide a variety of security measures to safeguard against fraud. In some situations, it may be useful to evaluate whether a caller is who they claim to be.

SUMMARY OF THE DISCLOSURE

Systems and methods described herein may help verify an identity of a user of phone-based account services. For example, a user's voice may be analyzed to determine whether it is characteristic of an expected user voice (e.g., the voice of the account holder). The analysis may involve determining whether the user's voice exhibits traits common to a known user demographic. Based at least in part on the analysis, the systems and methods described herein may evaluate a likelihood of fraud, for example determining whether a caller is likely the true account holder or not. Systems and methods described herein may also be trained with caller data from a plurality of callers to identify and/or sort traits common to one or more demographics.

Some embodiments of voice verification systems and methods may generate and use clusters of data for comparing with user voice data. A population may be divided into a set of demographics, for example based on geographic region, income level, and/or other sociological factors. Each demographic may have similar speech mannerisms. For example, a given demographic may include particular words in speech more frequently than other demographics, and/or a given demographic may pronounce words with specific sounds, emphases, timings, etc.

Disclosed embodiments may use known demographic data about callers to analyze callers' speech and characterize speech for the demographic(s) to which they belong. For example, a system performing speech analysis may have information about a caller's geographic location of residence and/or past residences and about the caller's income level and/or past income levels. This may be true because the caller may be an account holder who disclosed this information through account creation and/or maintenance, or the system may otherwise have access to this information. Accordingly, when an account holder's speech is analyzed, the data that results may be clustered together with data for other users known to have the same demographic information. Over time, the disclosed systems and methods may form clusters of data that accurately represent the specific speech mannerisms of specific demographics.

For example, a system configured to generate clusters may receive audio data including speech of a plurality of telephone calls. For at least a subset of the plurality of telephone calls, the system may determine demographic data for a telephone caller making the telephone call (e.g., based on an account associated with the caller). For at least the subset of the plurality of telephone calls, the system may analyze the audio data to identify a plurality of words from the speech of the telephone caller. In some embodiments, the system may also analyze the audio data to identify at least one acoustic characteristic of the speech of the telephone caller. In some embodiments, the system may correlate each of a plurality of portions of an acoustic or frequency component of the audio data with each of at least a subset of the plurality of words. The system may then determine at least one acoustic characteristic for how the telephone caller says at least one of the subset of the plurality of words based on the portion of the acoustic or frequency component of the audio data correlated with the at least one of the subset of the plurality of words.

In either case, the system may populate at least one word cluster with at least a subset of the plurality of words from the speech of each telephone caller associated with the specific demographic based on the demographic data for the telephone caller and/or populate at least one word cluster with at least a subset of the at least one acoustic characteristic of the speech of each telephone caller associated with the specific demographic based on the demographic data for the telephone caller. Each cluster may have a plurality of associated words from among at least the subset of the plurality of words and an occurrence frequency for each of the plurality of associated words that are characteristic to the cluster. Each cluster may also, or alternatively, have a plurality of associated acoustic characteristics that are characteristic to the cluster in some embodiments.

Once clusters are generated, they may be used to help verify a caller's identity. For example, account holders' voices may be analyzed to determine whether they are characteristic of any demographic indicated in their account data. In another example, prospective account holders' voices may be analyzed to identify demographic(s) to which they may be likely to belong. Based on the analysis, some embodiments disclosed herein may assess a threat level of a caller. For example, if a caller's demographic derived from voice analysis does not match any demographic associated with their account or prospective account, the analysis system may elevate a threat level for a caller, indicating that the caller may be attempting fraud (e.g., by impersonating the real account holder). This information may be added to other threat information collected by other systems and methods as part of a holistic threat score for the caller. In some embodiments, callers reaching a predetermined threat score threshold may be flagged for follow-up investigation and/or may have their account-related requests denied.

For example, a system configured to authenticate a telephone caller may receive audio data including speech of the telephone caller. The system may analyze the audio data to identify a plurality of words from the speech of the telephone caller and to identify an occurrence frequency for each of the plurality of words. In some embodiments, the system may analyze the audio data to identify at least one acoustic characteristic of the speech of the telephone caller. In some embodiments, the system may correlate each of a plurality of portions of an acoustic or frequency component of the audio data with each of at least a subset of the plurality of words. The system may then determine at least one acoustic characteristic for how the telephone caller says at least one of the subset of the plurality of words based on the portion of the acoustic or frequency component of the audio data correlated with the at least one of the subset of the plurality of words.

The system may compare the plurality of words, the occurrence frequencies, and/or the at least one acoustic characteristic of the speech to a plurality of word clusters. Each word cluster may comprise a plurality of associated words, an occurrence frequency for each of the plurality of associated words, and at least one associated acoustic characteristic. Each word cluster may be associated with one of a plurality of demographics.

The system may determine a most similar word cluster of the plurality of word clusters to the audio data based on a similarity of the plurality of words and the plurality of associated words of the most similar cluster, a similarity of the occurrence frequencies of the plurality of words and the occurrence frequencies of the plurality of associated words of the most similar cluster, and/or a similarity of the at least one acoustic characteristic of the speech of the telephone caller and the at least one associated acoustic characteristic of the most similar cluster.

The system may receive a purported identity of the telephone caller. The purported identity may include caller demographic data (e.g., based on an account associated with the caller and/or information provided by the caller during the call). For example, the caller demographic data may include current caller demographic data and/or historical caller demographic data. The system may compare the caller demographic data to the demographic associated with the most similar word cluster. Based on the comparing, the system may identify the telephone caller as likely having the purported identity if the caller demographic data (e.g., either current or historic) matches the demographic associated with the most similar word cluster. The system may identify the telephone caller as unlikely to have the purported identity if the caller demographic data matches a demographic associated with a word cluster different from the most similar word cluster.

The system may receive a threat score for the telephone caller. When the caller has a threat score, identifying the telephone caller as likely having the purported identity may include lowering the threat score or maintaining the threat score as received. Identifying the telephone caller as unlikely to have the purported identity may include raising the threat score.

The cluster-based voice analysis systems and methods described herein may provide several technological advantages. For example, by leveraging preexisting demographic data for callers, the disclosed systems and methods may train custom data clusters providing reliable representative data sets for speech patterns of callers fitting the demographics. The disclosed systems and methods may then be able to use the clusters to verify a caller's identity without the need to perform costly processing to exactly match the caller's voice to previously gathered recordings of the caller's voice and without having to store unique voiceprints for each known caller. Furthermore, because the clusters are specific to demographics rather than individual users, even callers who have never called before may be correlated with a demographic based on speech analysis. This effectively may mean that the disclosed systems and methods can perform voice verification for any given user without being trained on that particular user. These features may make the disclosed systems and methods better than traditional voice verification because of instant availability the first time a user calls. These features may also make the disclosed systems and methods better than traditional voice verification because there may be no need to gather, store, and continually train data for each user specifically. Instead, cluster data may be broadly applied to all users, significantly reducing processing complexity and data storage needs.

DETAILED DESCRIPTION OF SEVERAL EMBODIMENTS

Figure 1:
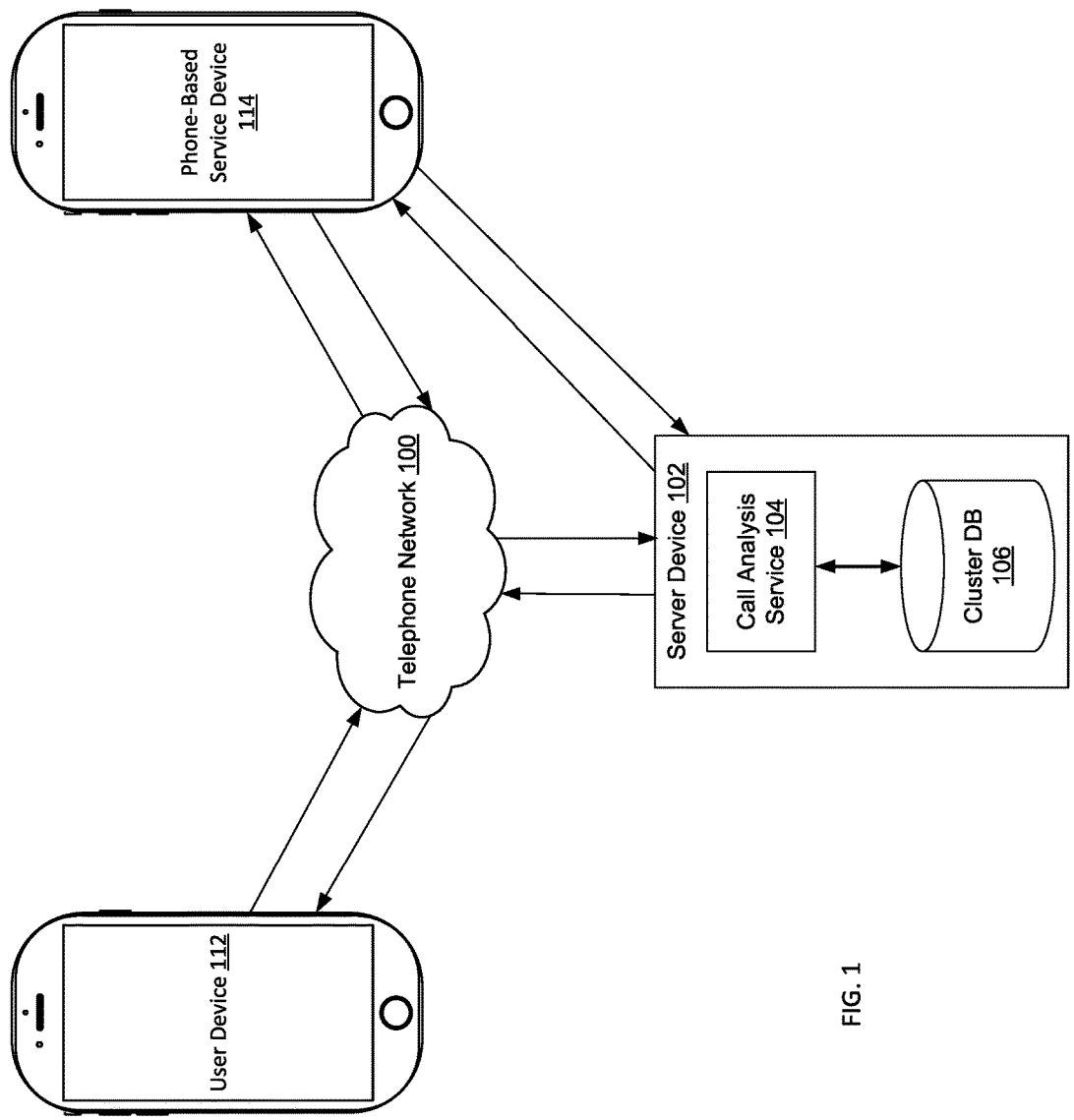
FIG. 1 shows a call analysis system according to an embodiment of the present disclosure.

FIG. 1 shows a call analysis system according to an embodiment of the present disclosure. The system may leverage a telephone network 100, which may include at least one public switched telephone network, at least one cellular network, at least one data network (e.g., the Internet), or a combination thereof. User device 112 may place a phone call through telephone network 100 to phone-based service device 114 or vice versa. User device 112 may be a smartphone, tablet, computer, IP phone, landline phone, or other device configured to communicate by phone call. User device 112 may be operated by an account holder, a potential account holder, or a fraudster attempting to access an account, for example. While one user device 112 is shown in FIG. 1 for ease of illustration, any number of user devices 112 may communicate using telephone network 100. Phone-based service device 114 may be a smartphone, tablet, computer, IP phone, landline phone, or other device configured to communicate by phone call. Phone-based service device 114 may be operated by an account service provider and/or an employee thereof (e.g., phone-based service device 114 may include a server configured to provide automated call processing services, a phone operated by a call center employee, or a combination thereof). While one phone-based service device 114 is shown in FIG. 1 for ease of illustration, any number of phone-based service devices 114 may communicate using telephone network 100.

One or more server devices 102 may be connected to network 100 and/or phone-based service device 114. Server device 102 may be a computing device, such as a server or other computer. Server device 102 may include call analysis service 104 configured to receive audio data for calls between user device 112 and phone-based service device 114 and analyze the audio data to assess caller demographics and/or identity, as described herein. Server device 102 may receive the audio data through network 100 and/or from phone-based service device 114. Server device 102 may include cluster database 106. Server device 102 may use cluster database to store data defining clusters of callers who fit various demographics which server device 102 may generate over time as described herein. Server device 102 may compare analyzed audio data to cluster data to determine a cluster demographic that best fits the caller, for example. Server device 102 may also store audio data for analysis in cluster database 106 and/or elsewhere in server device 102 memory.

Server device 102 is depicted as a single server including a single call analysis service 104 and cluster database 106 in FIG. 1 for ease of illustration, but those of ordinary skill in the art will appreciate that server device 102 may be embodied in different forms for different implementations. For example, server device 102 may include a plurality of servers. Call analysis service 104 may comprise a variety of services such as an audio analysis service, a word detection service, a cluster generation service, a cluster analysis service, a threat determination service, and/or other services, as described in greater detail herein.

Figure 2:
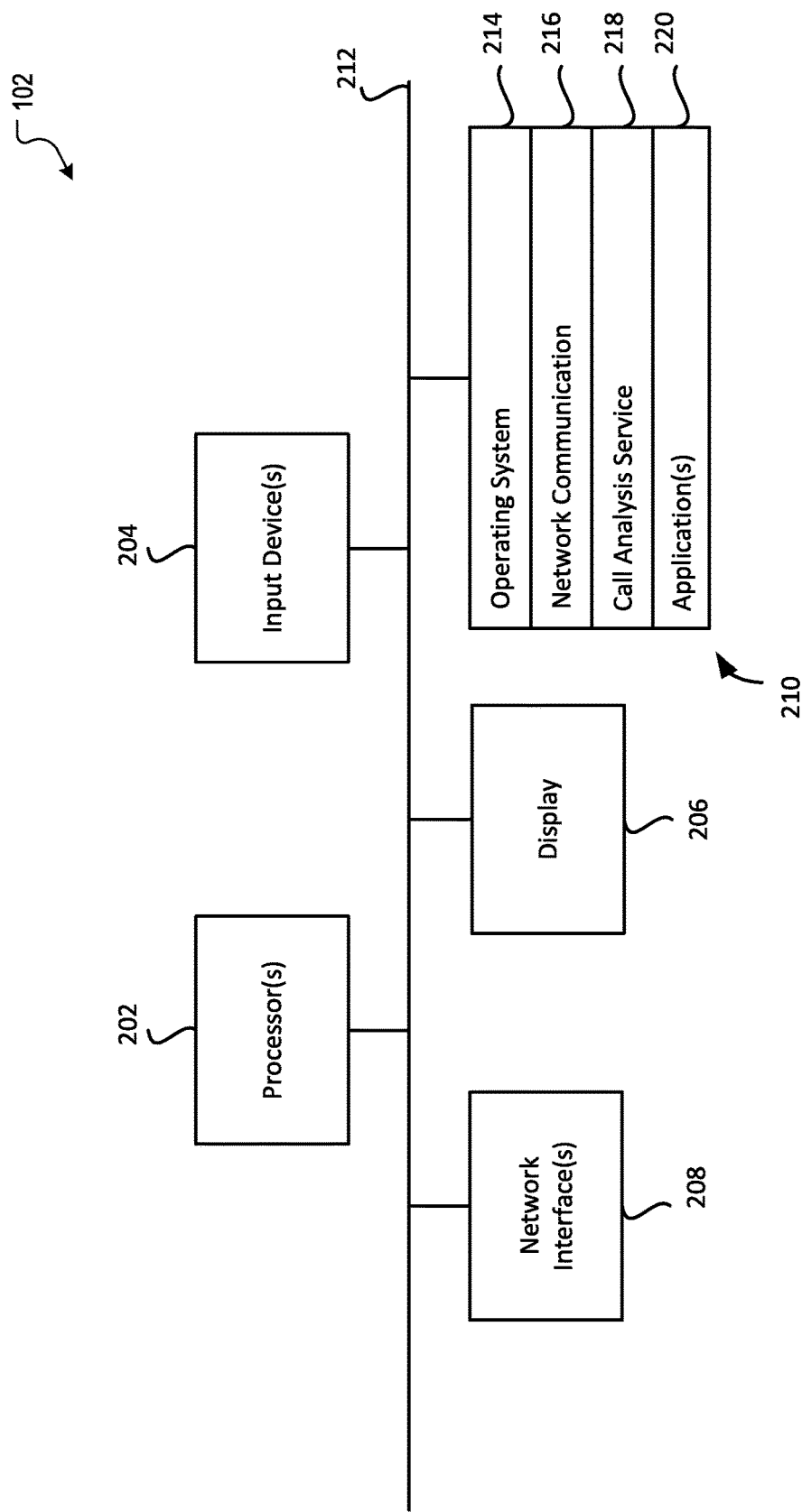
FIG. 2 shows a server device according to an embodiment of the present disclosure.

FIG. 2 is a block diagram of an example server device 102 that may implement various features and processes as described herein. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Call analysis service instructions 218 can include instructions that provide call analysis related functions described herein. For example, call analysis service instructions 218 may identify words in call audio, build clusters based on caller demographics, compare caller information to clusters, assess caller identity, determine caller threat level, etc.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
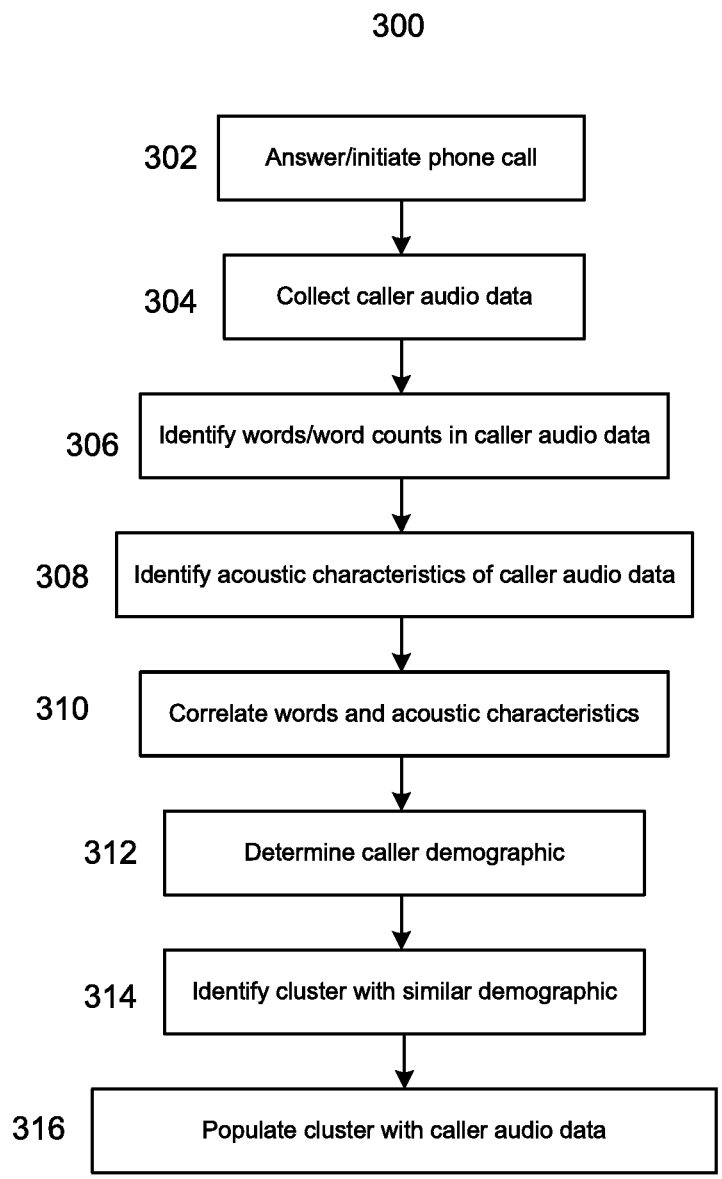
FIG. 3 shows a cluster generation process according to an embodiment of the present disclosure.

FIG. 3 shows a cluster generation process 300 according to an embodiment of the present disclosure. Server device 102 may perform cluster generation process 300 for calls where a participant's identity is verifiable in some other way. For example, server device 102 may perform cluster generation process 300 when an account holder has called from a known phone number and/or provided other indicia of their identity (e.g., provided data already found in their account data). In another example, server device 102 may perform cluster generation process 300 when phone-based service device 114 initiates the call to the account holder (e.g., to alert the account holder of account activity). In other embodiments, server device 102 may perform cluster generation process 300 for any or all calls.

At 302, one of user device 112 and phone-based service device 114 may initiate a phone call. In the following example, an account holder or other person operating user device 112 is the caller, and the caller places a call to phone-based service device 114. In this example, server device 102 may analyze the voice of the caller. However, the opposite case may also be true, where phone-based service device 114 places a call to user device 112, server device 102 may analyze the voice of the operator of user device 112.

At 304, server device 102 may collect caller audio data. For example, call analysis service 104 and/or phone-based service device 114 may include telephony recording hardware, software, and/or firmware configured to record the caller's voice and deliver the recording to call analysis service 104. The following steps of cluster generation process 300 may be performed in real time as the recording is fed to call analysis service 104 or may be performed on recorded call audio after the user has spoken.

At 306, server device 102 may identify words and/or word counts in the caller audio data. For example, call analysis service 104 may apply one or more machine learning and/or audio processing algorithms to the caller audio data to identify words and/or word counts. Suitable algorithms may include dynamic time warping, hidden Markov models, recurrent neural networks, and/or combinations thereof. For example, after likely words are identified using dynamic time warping audio analysis and/or hidden Markov prediction, recurrent neural network analysis may help identify which words were previously identified to better predict the current word being said. Through this processing, call analysis service 104 may be able to isolate words that may be unique to certain demographics. For example, some demographics may use "y' all" or "you guys" instead of the word "you" more frequently in speech than other demographics. If a caller uses one of these characteristic words frequently, the word identification processing may report a relatively high count of that word from the speech analysis.

At 308, server device 102 may identify acoustic characteristics of the caller audio data. For example, call analysis service 104 may use a fast Fourier transform (FFT) to convert the caller audio data into features that represent the tone, frequencies, speed, and/or loudness of the speaker. Call analysis service 104 may use cadence background noises to compare similarities in places one makes calls from as a secondary identifier (e.g., if the background noise sounds similar each time a user calls, unusual background noises may indicate the caller is calling from an unexpected location and may not be who they claim to be). Through this processing, call analysis service 104 may identify specific sounds that may be unique to certain demographics, such as tendencies to elongate or shorten vowel sounds and/or tendencies to speak more slowly or quickly than other demographics.

At 310, server device 102 may correlate the identified words and acoustic characteristics. For example, as words are identified at step 306, call analysis service 104 may record data indicating a time at which each word was spoken. Furthermore, as sounds are identified at step 308, call analysis service 104 may record data indicating a time at which each sound was uttered. By correlating the times at which words were spoken with the times at which sounds were made, call analysis service 104 may determine how the caller pronounced each word. Call analysis service 104 may use this information to identify pronunciations that may be unique to certain demographics. For example, once words and sounds are correlated, call analysis service 104 may determine whether a caller elongates or shortens specific vowel sounds within specific words, how long the caller pauses between words, whether the caller's tone of voice raises or lowers at the beginnings or ends of words, whether the caller's volume of voice raises or lowers at the beginnings or ends of words, a speed at which the caller speaks, a pitch of the caller's voice, how the caller says certain specific words (e.g., "hello" or "goodbye"), and/or whether the caller has any other specific speech tendencies.

At 312, server device 102 may determine a demographic for the caller. For example, call analysis service 104 may access account data for the caller. The account data may include the account holder's address of residence and previous addresses of residence. The account data may also include income information for the account holder. In some embodiments, the account data may include other information defining a demographic for the account holder (e.g., age, gender, occupation, etc.). Call analysis service 104 may use one or more of these data points to determine the demographic. For example, the caller may belong to a geographically-defined demographic based on their current home address and/or a home address where they grew up. Call analysis service 104 may select at least one determined demographic for the caller.

At 314, server device 102 may identify a cluster with a demographic similar to that of the caller. For example, call analysis service 104 may locate a cluster in cluster database 106 that is labeled with the determined demographic. If no such cluster exists in cluster database 106, call analysis service 104 may create the cluster in cluster database 106.

At 316, server device 102 may populate the identified cluster with caller audio data. For example, call analysis service 104 may add data describing the identified words and/or word counts from the caller audio data and/or data describing the identified audio characteristics from the caller audio data to the identified cluster in cluster database 106. In some embodiments, call analysis service 104 may compare the caller audio data with data already in the identified cluster to select a subset of the caller audio data for populating the identified cluster. For example, call analysis service 104 may use K-means clustering to identify the centers of clusters based on one or more of the words, word counts, and/or characteristics, and the caller may be identified with the cluster which is closest in distance based on the caller's own words, word counts, and/or characteristics. After a large enough subset of data is collected, call analysis service 104 may adjust centers of clusters to the mean of all data points considered to be within the cluster. Call analysis service 104 may also use dynamic topic models for specific word clustering. With large enough new datasets, call analysis service 104 may update dynamic topic model clusters in two phases: E-step and M-step (expectation maximization).

Figure 4:
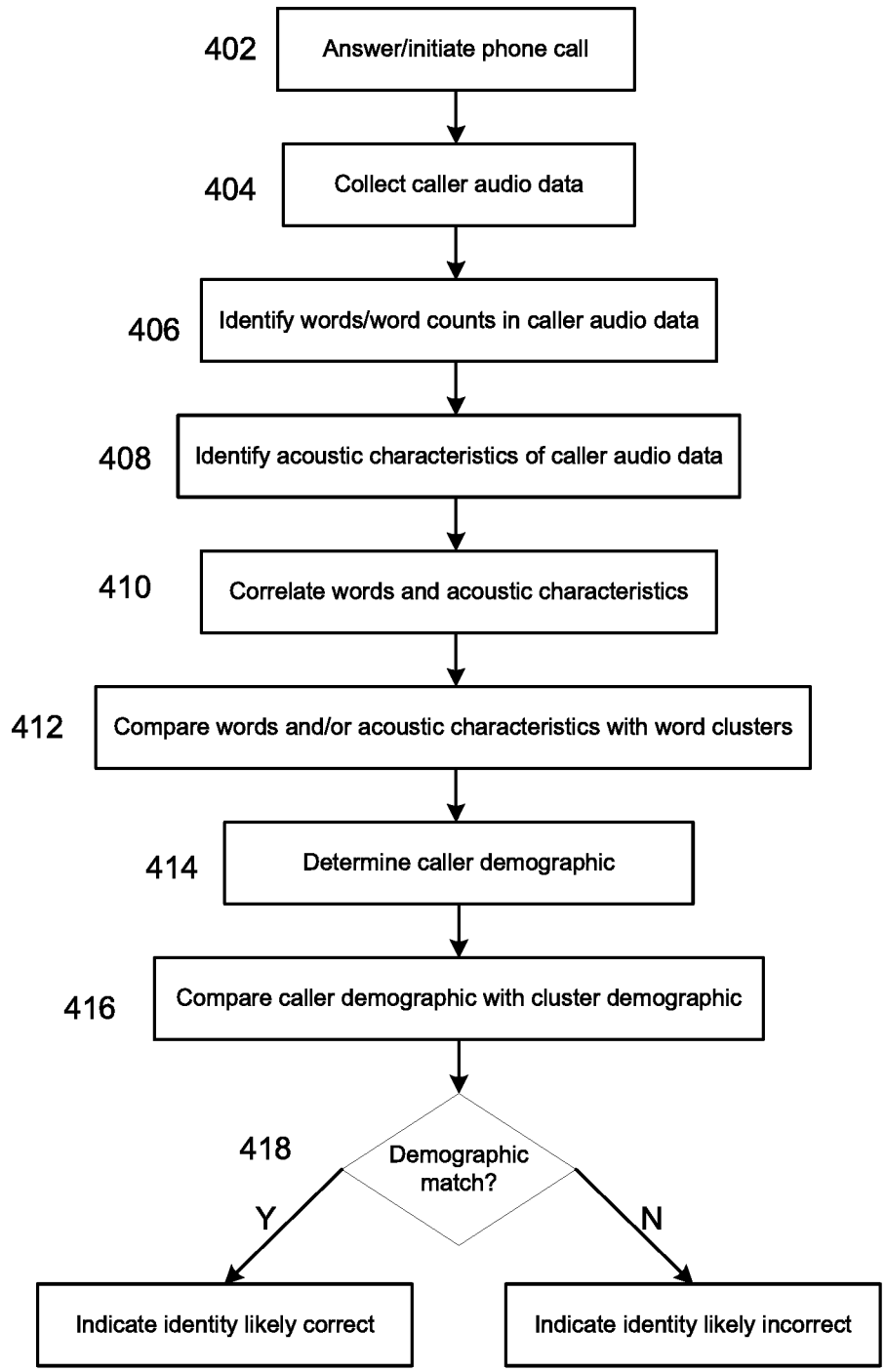
FIG. 4 shows a caller verification process according to an embodiment of the present disclosure.

FIG. 4 shows a caller verification process 400 according to an embodiment of the present disclosure. Server device 102 may perform caller verification process 400 to help determine whether a caller is who he or she claims to be. For example, server device 102 may perform caller verification process 400 for any calls placed while cluster database 106 contains a robust and detailed set of clusters. Given a trained cluster set, server device 102 may be able to determine whether a caller's voice is consistent with a demographic to which the caller is purported to belong. For example, server device 102 may analyze the voice of a caller attempting to open a new account to determine whether the voice is consistent with demographic information provided by the caller as part of the account setup process. In another example, server device 102 may analyze the voice of a caller attempting to access an account to determine whether the voice is consistent with known demographic(s) of the account holder.

At 402, one of user device 112 and phone-based service device 114 may initiate a phone call. In the following example, an account holder or other person operating user device 112 is the caller, and the caller places a call to phone-based service device 114. In this example, server device 102 may analyze the voice of the caller. However, the opposite case may also be true, where phone-based service device 114 places a call to user device 112, server device 102 may analyze the voice of the operator of user device 112.

At 404, server device 102 may collect caller audio data. For example, call analysis service 104 and/or phone-based service device 114 may include telephony recording hardware, software, and/or firmware configured to record the caller's voice and deliver the recording to call analysis service 104. The following steps of caller verification process 400 may be performed in real time as the recording is fed to call analysis service 104 or may be performed on recorded call audio after the user has spoken.

At 406, server device 102 may identify words and/or word counts in the caller audio data. For example, call analysis service 104 may apply one or more machine learning and/or audio processing algorithms to the caller audio data to identify words and/or word counts. Suitable algorithms may include dynamic time warping, hidden Markov models, recurrent neural networks, and/or combinations thereof. For example, after likely words are identified using dynamic time warping audio analysis and/or hidden Markov prediction, recurrent neural network analysis may help identify which words were previously identified to better predict the current word being said. Through this processing, call analysis service 104 may be able to isolate words that may be unique to certain demographics. For example, some demographics may use "y'all" or "you guys" instead of the word "you" more frequently in speech than other demographics. If a caller uses one of these characteristic words frequently, the word identification processing may report a relatively high count of that word from the speech analysis.

At 408, server device 102 may identify acoustic characteristics of the caller audio data. For example, call analysis service 104 may use a fast Fourier transform (FFT) to convert the caller audio data into features that represent the tone, frequencies, speed, and/or loudness of the speaker. Call analysis service 104 may use cadence background noises to compare similarities in places one makes calls from as a secondary identifier (e.g., if the background noise sounds similar each time a user calls, unusual background noises may indicate the caller is calling from an unexpected location and may not be who they claim to be). Through this processing, call analysis service 104 may identify specific sounds that may be unique to certain demographics, such as tendencies to elongate or shorten vowel sounds and/or tendencies to speak more slowly or quickly than other demographics.

At 410, server device 102 may correlate the identified words and acoustic characteristics. For example, as words are identified at step 406, call analysis service 104 may record data indicating a time at which each word was spoken. Furthermore, as sounds are identified at step 408, call analysis service 104 may record data indicating a time at which each sound was uttered. By correlating the times at which words were spoken with the times at which sounds were made, call analysis service 104 may determine how the caller pronounced each word. Call analysis service 104 may use this information to identify pronunciations that may be unique to certain demographics. For example, once words and sounds are correlated, call analysis service 104 may determine whether a caller elongates or shortens specific vowel sounds within specific words, how long the caller pauses between words, whether the caller's tone of voice raises or lowers at the beginnings or ends of words, whether the caller's volume of voice raises or lowers at the beginnings or ends of words, a speed at which the caller speaks, a pitch of the caller's voice, how the caller says certain specific words (e.g., "hello" or "goodbye"), and/or whether the caller has any other specific speech tendencies.

At 412, server device 102 may compare the identified words and/or acoustic characteristics with the clusters in cluster database 106. For example, call analysis service 104 may use a K-nearest neighbors algorithm to compare the identified words and/or acoustic characteristics with the K-means and/or dynamic topic models generated as described above. Through this processing, call analysis service 104 may identify a cluster in cluster database 106 that contains data that is most similar to the user's speech. The identified cluster may be associated with a particular demographic.

At 414, server device 102 may determine a demographic for the caller. For example, call analysis service 104 may access account data for the caller. The account data may include the account holder's address of residence and previous addresses of residence. The account data may also include income information for the account holder. In some embodiments, the account data may include other information defining a demographic for the account holder (e.g., age, gender, occupation, etc.). Call analysis service 104 may use one or more of these data points to determine the demographic. For example, the caller may belong to a geographically-defined demographic based on their current home address and/or a home address where they grew up. In some situations, for example when the caller is attempting to open an account, call analysis service 104 may not have access to predetermined caller demographic data. In these cases, call analysis service 104 may determine the caller's demographic based on information about the call (e.g., a phone number for the caller or an IP address for the caller) and/or based on information provided by the caller (e.g., one or more spoken addresses of past or current residence and/or income level provided by the caller). Call analysis service 104 may select at least one determined demographic for the caller.

At 416, server device 102 may compare the caller's demographic with the demographic of the cluster from cluster database 106 that most nearly matches the identified words and/or acoustic characteristics from the audio data. For example, the caller may say they are a specific account holder, and that specific account holder may have a particular income level (e.g., $100,000/yr) and/or current and/or historical addresses (e.g., the account holder may have been born and raised in Alabama and may now live in Ohio). In another example, the caller may self-report the income level and/or current and/or historical addresses to provide background information to open an account. In some embodiments, the income level and/or current and/or historical addresses may be obtained from credit rating bureaus and/or from data associated with other known accounts. Call analysis service 104 may compare this account holder information or self-reported information with the demographic information associated with the cluster from cluster database 106 that most nearly matches the caller's speech.

At 418, server device 102 may determine whether the demographics match and indicate a result. For example, call analysis service 104 may receive a threat level score for the user. The threat level score may be a score that takes a variety of security-related factors into account to assess whether a caller is attempting fraudulent activity. In this example, a higher score may indicate a higher risk of fraud, although other embodiments may score likelihood of fraud differently (e.g., a lower score indicates a higher risk of fraud). Continuing the example, the cluster from cluster database 106 that most nearly matches the caller's speech may be a cluster of callers who earn $100,000/yr from Alabama. In this case, call analysis service 104 may determine that the caller's demographic matches the cluster's demographic and, therefore, the identity provided by the caller is likely to be correct. To indicate that the caller's identity is likely correct, call analysis service 104 may either downgrade the threat score or maintain the score at the same level. In an alternative example, the cluster from cluster database 106 that most nearly matches the caller's speech may be a cluster of callers who earn $30,000/yr from Florida. In this case, call analysis service 104 may determine that the caller's demographic does not match the cluster's demographic and, therefore, the identity provided by the caller is unlikely to be correct. To indicate that the caller's identity is not likely to be correct, call analysis service 104 may upgrade the threat score. Call analysis service 104 may report the threat score as adjusted through process 400, for example by providing the score to the operator of phone-based service device 114 and/or to a fraud prevention system for further analysis and/or action (e.g., analyzing the caller's actions for fraudulent activity, analyzing the account for fraudulent activity, blocking actions taken to affect the account, etc.).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   receiving, by a processor of an authentication server, audio data including speech of a user;
   analyzing, by the processor, the audio data to identify at least one characteristic of the speech of the user;
   associating, by the processor, the at least one characteristic to a cluster based on a comparison with a plurality of known characteristics, each known characteristic being associated with at least one cluster;
   receiving, by the processor, data indicative of a purported identity of the user;
   comparing, by the processor, the data indicative of the purported identity to data indicative of the at least one cluster; and
   identifying, by the processor, the user as at least one of:
      likely having the purported identity in response to determining the data indicative of the purported identity matches the data indicative of the at least one cluster, and
      unlikely to have the purported identity in response to determining the data indicative of the purported identity matches data indicative of a different cluster.

2. The method of claim 1, wherein:
   the at least one characteristic of the speech of the user comprises a plurality of words;
   each known characteristic comprises a plurality of associated words; and
   the associating comprises determining a similarity of the plurality of words and the plurality of associated words of the associated cluster.

3. The method of claim 2, wherein:
   the at least one characteristic of the speech of the user comprises an occurrence frequency for each of the plurality of words;
   each known characteristic comprises an occurrence frequency for each of the plurality of associated words; and
   the associating comprises determining a similarity of the occurrence frequency for each of the plurality of words and the occurrence frequency for each of the plurality of associated words of the associated cluster.

4. The method of claim 2, wherein:
the at least one characteristic of the speech of the user further comprises at least one acoustic characteristic;
each known characteristic further comprises at least one acoustic characteristic; and
the analyzing of the audio data to identify at least one acoustic characteristic of the speech of the user comprises:
correlating each of a plurality of portions of an acoustic or frequency component of the audio data with each of at least a subset of the plurality of words; and
determining the at least one acoustic characteristic for how the user says at least one of the subset of the plurality of words based on the portion of the acoustic or frequency component of the audio data correlated with the at least one of the subset of the plurality of words.

5. The method of claim 1, wherein:
the at least one characteristic of the speech of the user comprises at least one acoustic characteristic;
each known characteristic comprises at least one acoustic characteristic; and
the associating comprises determining a similarity of the at least one acoustic characteristic and the at least one acoustic characteristic of the associated cluster.

6. The method of claim 1, wherein:
the data indicative of the at least one of the plurality of users comprises current individual data and historical individual data;
determining the data indicative of the purported identity matches the data indicative of the at least one of the plurality of users comprises determining at least one of the current individual data and the historical individual data matches the at least one of the plurality of users associated with the associated cluster; and
determining the data indicative of the purported identity matches data indicative of a different at least one of the plurality of users comprises determining at least one of the current individual data and the historical individual data matches the at least one user associated with the known characteristic different from the associated cluster.

7. The method of claim 1, further comprising:
receiving, by the processor, a threat score for the user;
wherein the identifying, by the processor, the user as likely having the purported identity comprises lowering the threat score or maintaining the threat score as received.

8. The method of claim 1, further comprising:
receiving, by the processor, a threat score for the user;
wherein the identifying, by the processor, the user as unlikely to have the purported identity comprises raising the threat score.

9. A system for user authentication, the system comprising:
a recorder configured to record audio data of speech spoken by a user;
an authentication server comprising a processor and a non-transitory memory, the memory storing instructions that, when executed by the processor, cause the processor to perform processing comprising:
receiving audio data including speech of a plurality of users;
using audio data for at least a subset of the plurality of users to store a plurality of known characteristics, each known characteristic being associated with at least one cluster, the storing comprising:
for each of the subsets of the plurality of users, determining identifying data for each user, and analyzing the audio data to identify at least one characteristic of the speech of the user, and
storing the at least one characteristic of the speech of each user included in the plurality of users based on the identifying data for the user as the known characteristic; and
using audio data for at least one of the plurality of users to identify the user, the identifying comprising:
analyzing the audio data to identify at least one characteristic of the speech of the user,
associating the at least one characteristic to a cluster based on a comparison with a plurality of known characteristics, each known characteristic being associated with at least one cluster,
receiving data indicative of a purported identity of the user, and
identifying the user as:
likely having the purported identity in response to determining the data indicative of the purported identity matches the data indicative of the at least one of the plurality of users, or
unlikely to have the purported identity in response to determining the data indicative of the purported identity matches data indicative of a different at least one of the plurality of users.

10. The system of claim 9, wherein:
the at least one characteristic of the speech of the user comprises a plurality of words;
each known characteristic comprises a plurality of associated words; and
the associating comprises determining a similarity of the plurality of words and the plurality of associated words of the associated cluster.

11. The system of claim 10, wherein:
the at least one characteristic of the speech of the user comprises an occurrence frequency for each of the plurality of words;
each known characteristic comprises an occurrence frequency for each of the plurality of associated words; and
the associating comprises determining a similarity of the occurrence frequency for each of the plurality of words and the occurrence frequency for each of the plurality of associated words of the associated cluster.

12. The system of claim 10, wherein:
the at least one characteristic of the speech of the user further comprises at least one acoustic characteristic;
each known characteristic further comprises at least one acoustic characteristic; and
the analyzing of the audio data to identify at least one acoustic characteristic of the speech of the user comprises:
correlating each of a plurality of portions of an acoustic or frequency component of the audio data with each of at least a subset of the known characteristics; and
determining the at least one acoustic characteristic for how the user says at least one of the subset of the plurality of words based on the portion of the acoustic or frequency component of the audio data correlated with the at least one of the subsets of the known characteristics.

13. The system of claim 9, wherein:
the at least one characteristic of the speech of the user comprises at least one acoustic characteristic;
each known characteristic comprises at least one acoustic characteristic; and
the associating comprises determining a similarity of the at least one acoustic characteristic and the at least one acoustic characteristic of the associated cluster.

14. The system of claim 9, wherein:
the processing further comprises receiving a threat score for the user; and
the identifying the user as unlikely to have the purported identity comprises affecting the threat score.

15. A non-transitory computer readable medium storing instructions that, when executed by a processor, cause the processor to perform processing comprising:
receiving audio data including speech of a user;
analyzing the audio data to identify at least one characteristic of the speech of the user;
associating the at least one characteristic to a cluster based on a comparison with a plurality of known characteristics, each known characteristic being associated with at least one cluster;
receiving data indicative of a purported identity of the user;
comparing the data indicative of the purported identity to data indicative of the at least one cluster; and
identifying the user as at least one of:
likely having the purported identity in response to determining the data indicative of the purported identity matches the data indicative of the at least one cluster, and
unlikely to have the purported identity in response to determining the data indicative of the purported identity matches data indicative of a different cluster.

16. The computer readable medium of claim 15, wherein:
the at least one characteristic of the speech of the user comprises a plurality of words;
each known characteristic comprises a plurality of associated words; and
the associating comprises determining a similarity of the plurality of words and the plurality of associated words of the associated cluster.

17. The computer readable medium of claim 16, wherein:
the at least one characteristic of the speech of the user comprises an occurrence frequency for each of the plurality of words;
each known characteristic comprises an occurrence frequency for each of the plurality of associated words; and
the associating comprises determining a similarity of the occurrence frequency for each of the plurality of words and the occurrence frequency for each of the plurality of associated words of the associated cluster.

18. The computer readable medium of claim 16, wherein:
the at least one characteristic of the speech of the user further comprises at least one acoustic characteristic;
each known characteristic further comprises at least one acoustic characteristic; and
the analyzing of the audio data to identify at least one acoustic characteristic of the speech of the user comprises:
correlating each of a plurality of portions of an acoustic or frequency component of the audio data with each of at least a subset of the plurality of words; and
determining the at least one acoustic characteristic for how the user says at least one of the subset of the plurality of words based on the portion of the acoustic or frequency component of the audio data correlated with the at least one of the subset of the plurality of words.

19. The computer readable medium of claim 15, wherein:
the at least one characteristic of the speech of the user comprises at least one acoustic characteristic;
each known characteristic comprises at least one acoustic characteristic; and
the associating comprises determining a similarity of the at least one acoustic characteristic and the at least one acoustic characteristic of the associated cluster.

20. The computer readable medium of claim 15, wherein:
the data indicative of the at least one of the plurality of users comprises current individual data and historical individual data;
determining the data indicative of the purported identity matches the data indicative of the at least one of the plurality of users comprises determining at least one of the current individual data and the historical individual data matches the at least one of the plurality of users associated with the associated cluster; and
determining the data indicative of the purported identity matches data indicative of a different at least one of the plurality of users comprises determining at least one of the current individual data and the historical individual data matches the at least one users associated with the known characteristic different from the associated cluster.

* * * * *